W. ANDERSON.

Improvement in Mowing Machines.

No. 125,429. Patented April 9, 1872.

Witnesses.

Inventor.

125,429

UNITED STATES PATENT OFFICE.

WESLEY ANDERSON, OF NEWTON, NEW JERSEY.

IMPROVEMENT IN MOWING-MACHINES.

Specification forming part of Letters Patent No. 125,429, dated April 9, 1872.

I, WESLEY ANDERSON, of the town of Newton, county of Sussex and State of New Jersey, have made an improvement upon an invention for throwing mowing-machines in and out of gear, and also for the prevention of accidents to the driver of the same, of which the following is a specification:

My invention relates to a certain false seat placed within the real seat of the mowing-machine and connected with the clutch by levers and a spring, so that the weight of the driver will throw the machine in gear and the absence of his weight will throw it out of gear, as hereinafter described.

Figure 1 is a representation of a portion of the frame of a mowing-machine with my invention attached. Fig. 2 shows the seat of the mowing-machine with the false seat attached.

Description of Drawing.

E is a false or inner seat placed within the real seat. One side of this false seat is fastened to the real seat by a hinge. The other side of said false seat is loose, and, by its hinge-fastening, is free to move up and down. This false seat has two projections, H H', a few inches long and a few inches apart. One of these projections, H', has three notches or stops. The other projection is not notched. D is a round steel bar running through the hole in the end of lever B. One end of this bar D is pivoted on the projection from the false seat, not notched. The other end of said bar may move up and down over the notched side of the other projection from the false seat. B is a lever a few feet in length; has a hole through the end nearest the false seat. Through this hole the bar D runs, it bringing the end of lever B between the two projections from the false seat. The lower end of lever B strikes against the lever A. A is a lever moving horizontally on the frame of the machine, and, as it is moved back and forth, throws the machine in and out of gear. On this lever A, where lever B strikes it, there is a roller to prevent friction upon their coming in contact. G is a spring which presses against lever A, and, when there is no weight in the false seat to cause lever B to press against lever A and push it to the dotted line, the spring G pushes back lever A and throws the machine out of gear.

The following is the manner in which the above-mentioned devices, in combination with each other, operate: When there is no weight in the false seat the spring G pushes lever A to the right. Lever A strikes against lever B and pushes it also to the right; and, in consequence thereof, one side of said false seat—the side opposite the hinge—being attached to lever B, is raised from the natural seat some few inches. Now, when the driver places himself in the false seat, it presses said false seat down to the natural seat and causes lever B to move toward the dotted line. The extreme end of lever B strikes lever A and pushes it to the dotted line, which throws the machine in gear; and as long as the driver remains in his seat the false seat is pressed down to the natural seat, and the machine is held in gear; but the moment the driver leaves or is thrown from his seat the machine is thrown out of gear by the spring G, as above described.

Figure 1:
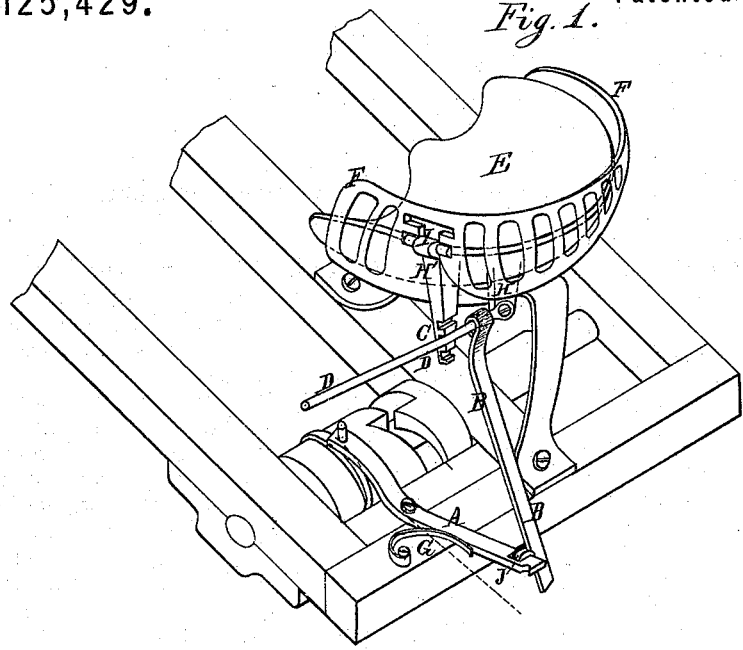
Figure 2:
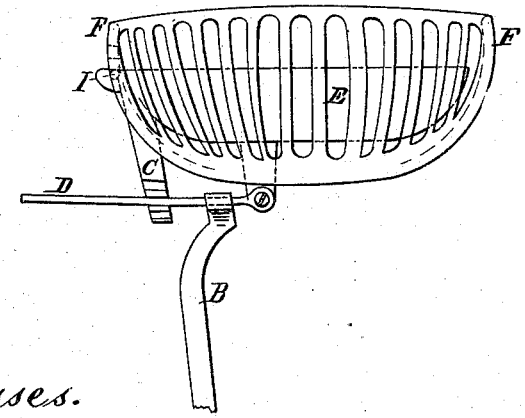

Aside from the way of throwing it in and out of gear before mentioned, (the weight of the driver in the false seat or the absence of his weight,) it may also be thrown out of gear while the driver is in the seat. If he wishes to do this, he reaches behind him, takes hold of the bar D, removes the end from the center notch or stop in the notched projection from false seat, and lets it drop into the notch or catch below. This throws lever B back from, and prevents its pressing against, lever A. The spring G pushes lever A back from the dotted line, and the machine is thrown out of gear while the driver is in his seat.

The machine may also be thrown in gear while the driver is off his seat. If he wishes to do this, he takes hold of the end of bar D that moves over the notched projection from the false seat, raises it to the highest notch or stop in said notched projection, and lets it drop therein. This throws the lower end of lever B toward lever A, causes it to strike lever A, and pushes it to the dotted line and throws the machine in gear while the driver is out of his seat.

Claim.

I claim as my invention—

The hinged seat E, having projection H and notched projection H', in combination with bar D, lever B, shipping-lever A, and spring G, substantially as and for the purpose shown and described.

WESLEY ANDERSON.

Witnesses present:
 THOMAS VANRIPER,
 RUDOLPH HELLER.